Jan. 9, 1934.  C. H. VOGT  1,942,582
SAUSAGE MAKING METHOD AND APPARATUS
Filed Feb. 21, 1928  4 Sheets-Sheet 1
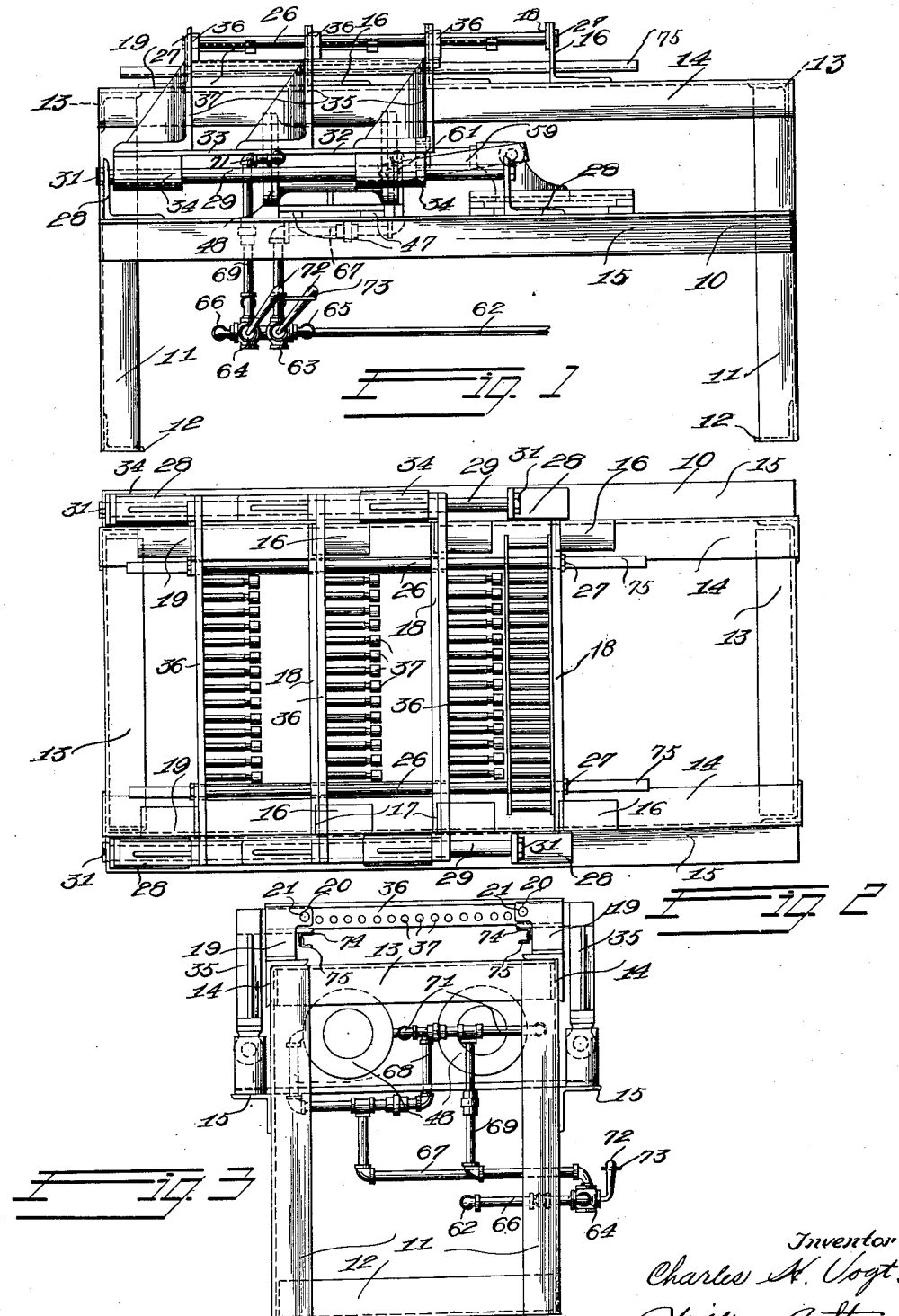
Inventor
Charles H. Vogt.
William A. Strauch
Attorney.

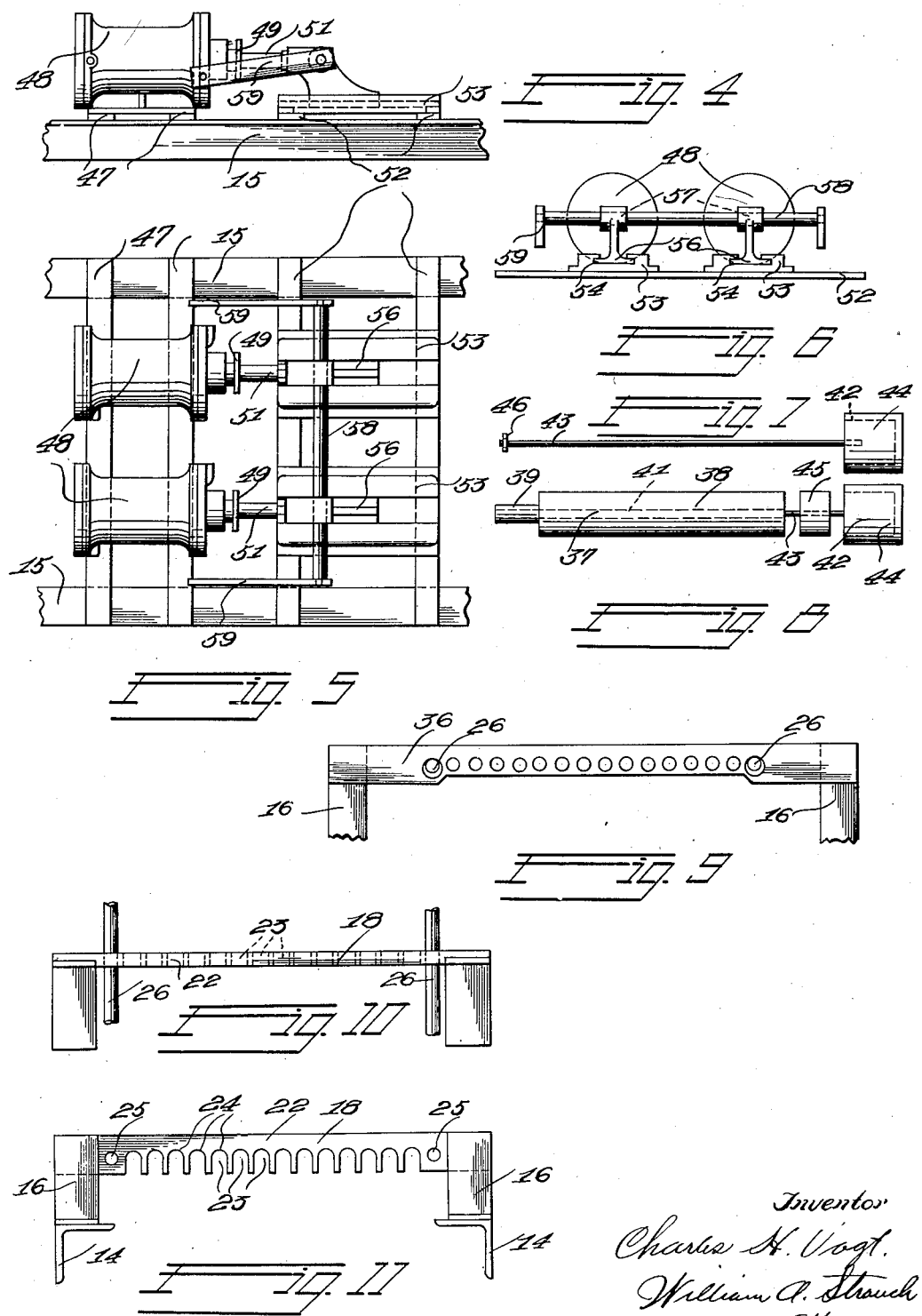

Jan. 9, 1934.  C. H. VOGT  1,942,582
SAUSAGE MAKING METHOD AND APPARATUS
Filed Feb. 21, 1928   4 Sheets-Sheet 3
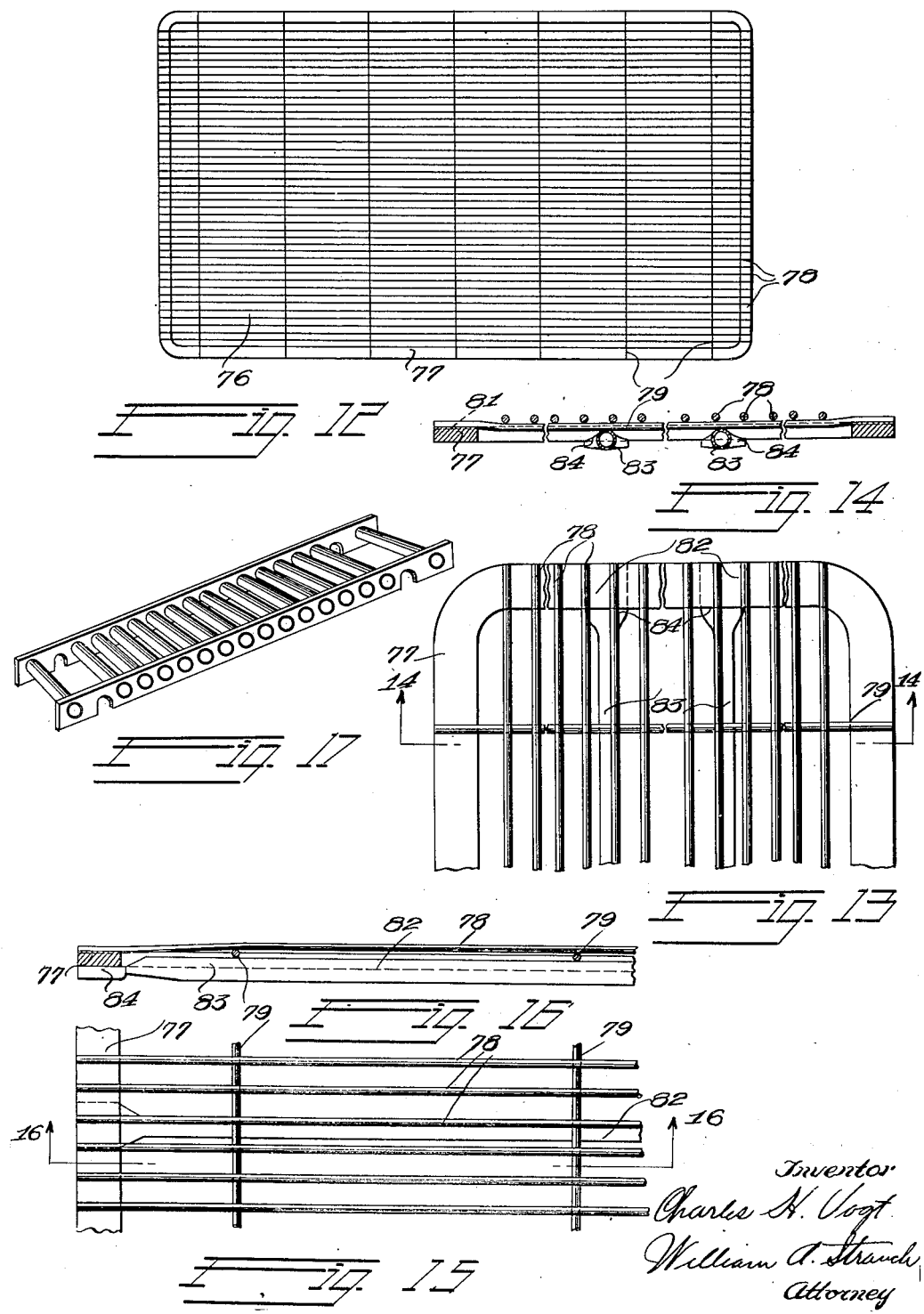

Jan. 9, 1934.   C. H. VOGT   1,942,582
SAUSAGE MAKING METHOD AND APPARATUS
Filed Feb. 21, 1928   4 Sheets-Sheet 4
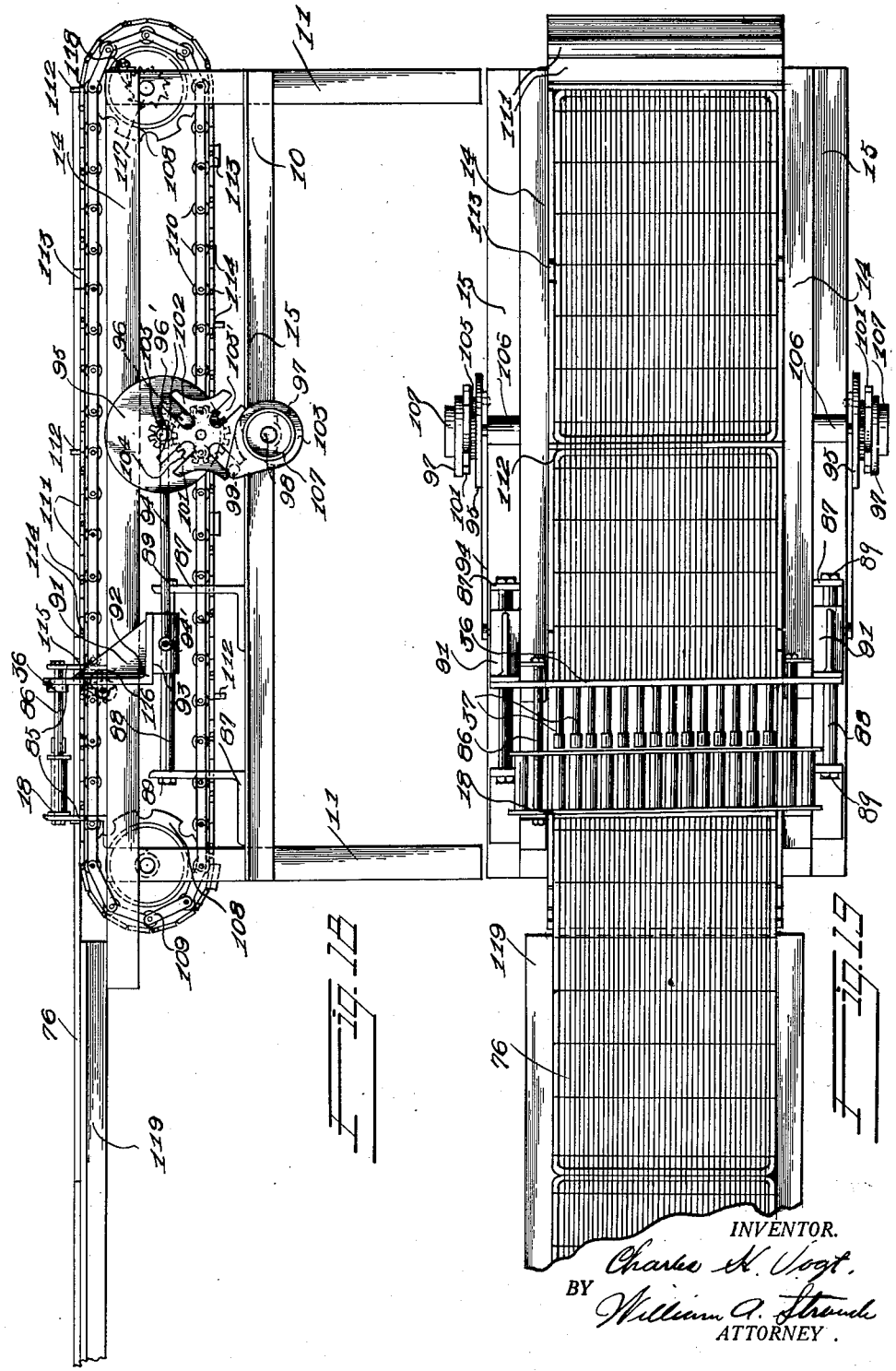
INVENTOR.
Charles H. Vogt.
BY
William A. Strauch
ATTORNEY.

Patented Jan. 9, 1934

1,942,582

UNITED STATES PATENT OFFICE 1,942,582

SAUSAGE MAKING METHOD AND APPARATUS

Charles H. Vogt, Philadelphia, Pa.

Application February 21, 1928. Serial No. 255,942

16 Claims. (Cl. 17—32)

This invention relates to methods and apparatus for the production of sausage. More specifically the invention relates to methods and apparatus for the manufacture of casingless sausage, and the present application is particularly directed to methods and apparatus for removing pre-formed sausage meat from molds of the character disclosed in my co-pending application Serial No. 255,941 filed on even date herewith, after the molds have been filled with sausage meat and the meat set to form by the apparatus and process as disclosed in said application, and for effectively handling the pre-formed sausage during the subsequent treatment thereof.

In the production of casingless sausages in which the sausage meat is filled into molds in accordance with the practice disclosed in said application it is necessary in the commercial manufacture of sausages to provide a means whereby the sausages after having been formed in the molds may be expeditiously expelled from the molds and thereafter maintained in proper shape during the completion of the treatment of the sausage.

It is accordingly an object of the present invention to provide methods and apparatus for ejecting pre-formed sausages from moulds whereby the sausages may be ejected from the molds expeditiously and without deformation of the shape of the pre-formed sausage.

It is another object of my invention to provide apparatus on which the pre-formed sausages are disposed and maintained in properly spaced non-contacting relation for subsequent processing steps, and are held straight during further treatment so that straight sausage will be provided.

It is still another object of the present invention to provide apparatus for ejecting sausages from molds that is power actuated and so constructed that sausages can be ejected from the molds expeditiously with the services of few attendants.

A further object of my present invention is to provide apparatus for ejecting and supporting pre-formed sausages from molds which are simple in construction, and accurate and efficient in operation.

With the above objects in view as well as others that will become apparent from the following disclosure, reference will now be had to the accompanying drawings forming a part thereof and in which—

Fig. 1 is a side elevation of one form of ejecting apparatus embodying my invention.

Fig. 2 is a top plan view of the structure disclosed in Fig. 1 with the actuating mechanism omitted for the sake of clearness.

Fig. 3 is an end elevation as viewed from the left of the mechanism shown in Fig. 1.

Fig. 4 is a side elevation of the carriage actuating mechanism for the form of invention shown in Figure 1.

Fig. 5 is a top plan view, and Fig. 6 is an end elevation of the structure disclosed in Figs. 4 and 5 as viewed from the right thereof.

Fig. 7 is a detailed view of one of the elements of one of the ejectors used.

Fig. 8 is a complete view of one of the ejectors shown in partly disassembled position.

Fig. 9 is an end view of the ejector assembly.

Fig. 10 is a top plan view of one of the stationary guides used in the machine shown in Figure 1.

Fig. 11 is a side elevational view of the structure disclosed in Fig. 10.

Fig. 12 is a top plan view of one of the screens employed with the apparatus shown in Figure 1.

Fig. 13 is a broken enlarged top plan view of one end of the screen disclosing more particularly the relation of the intersecting wires with the marginal frame and also the longitudinal brace members which have their ends secured to the end portions of the frame.

Fig. 14 is a transverse sectional view taken on line 14—14 of Fig. 13.

Fig. 15 is a fragmental top plan view of the screen at right angles to the position of Fig. 13.

Fig. 16 is a longitudinal sectional view taken on line 16—16 of Fig. 15.

Fig. 17 is a perspective view of one of the mold structures.

Fig. 18 is a side elevational view of a modified form of ejecting apparatus and

Fig. 19 is a top plan view of the construction illustrated in Fig. 18.

Referring now to the drawings by reference characters in which like characters designate like parts. 10 designates a frame structure comprising four vertical leg members 11 two of which are disposed at each end of the frame in transverse spaced relation, connected at the lower ends thereof by a transversely extending member 12 and connected at the upper end thereof by a similar member 13 extending transversely of the frame member. Secured at their ends to contiguous ends of members 11 and 13 are a pair of supporting members 14 and extending longitudinally of the frame below the members 14 and secured at their ends to the outer faces of members 11 are a pair of supporting members 15.

All of the above referred to members entering into the construction of the frame, as is clearly disclosed in Figs. 1, 2 and 3, are of L-section providing a frame that is relatively light and yet sufficiently strong to support the mechanism hereinafter described.

The horizontally extending members 14 have secured thereto and support the horizontally extending portions of a plurality of L-shaped brackets 16, Figs. 1 and 2, the vertical legs of which are at their upper ends secured in recesses 17, Fig. 2 in corresponding ends of transversely disposed guide members 18. As shown in Figs. 1 and 2 there are preferably three pairs of transversely alined brackets 16 and accordingly three guides 18 transversely disposed relative to members 14 and being in uniform longitudinal disposition.

Besides brackets 16 above referred to a pair of brackets 19 is provided in transverse alinements and spaced longitudinally from the adjacent brackets 16 equal to the longitudinal spacing of the transversely disposed pairs of brackets 16. Brackets 19 have their horizontal sections secured to horizontal members 14 and their vertically extending legs provided with oppositely facing inwardly extending projections 20 each of which is provided with an aperture 21. Each of the guides 18 comprises a flat bar 22 (Figs. 10 and 11) provided with a plurality of inwardly opening slots 23 having arcuate outer closed ends 24. Each of the guides 18 is further provided with a pair of apertures 25, one adjacent each end thereof. The aperture 21 in each bracket 19 is in longitudinal alinement with apertures 25 in corresponding ends of the guides 18. Detachably supported in each series of longitudinally disposed apertures is a guiding and supporting rod 26, the rods being retained in position by nuts 27 threaded on the ends thereof and engaging the corresponding brackets 16 and 19.

Resting upon and secured to the horizontal leg of each member 15 are the horizontal feet of a pair of longitudinally spaced L-shaped brackets 28 whose vertical legs at the upper ends thereof support a longitudinally disposed guide rod 29, the guide rods being retained in position by nuts 31 threaded on the ends thereof and engaging the outer faces of said vertical legs. Slidably supported by guide rods 29 is a carriage 32 which in its construction comprises an elongated plate 33 provided at its opposite ends with a pair of tubular guides 34. Supported by and secured by the outer face of the plate 33 are the horizontal feet of a plurality of L-shaped brackets 35 the outer ends of whose vertical legs are secured to corresponding ends of ejector bars 36. The end set of ejector bars 36 in un-operated position engages brackets 19 while the other illustrated sets engage a pair of the guides 18. Secured to each of the ejector bars 36 are a plurality of ejectors 37 corresponding in number to slots 23 in each guide 18. Each of the ejectors 37 is of sectional formation as is disclosed in Figs. 7 and 8 and comprises a body member 38 and a reduced integral extension 39 jointly provided with a central longitudinally extending bore 41. Each ejector 37 is provided with a head member 42 secured to a rod 43 adapted to extend through bore 41. Head members 42 are provided with rubber caps 44 which are preferably molded thereon and a spacing member 45 is provided which is of slightly less diameter than member 38 and adapted to rest between members 38 and 42.

Ejectors 37 are detachably secured to bars 36 by introducing their extensions 39 into apertures in bars 36 and turning up nuts 46 on rods 43 into engagement with the bars, consequently drawing the members 38, 44 and 45 into engagement with each other and the members 38 into engagement with the bars.

Supported at their opposite ends on members 15 are a pair of transversely extending supporting members 47 on which are supported a pair of air cylinders 48 each of which is provided with an adjustable packing gland 49 (Figs. 4 and 5) and a piston rod 51 connected at its inner end to a piston (not shown). Supported at their opposite ends on the members 15 are a pair of transversely disposed supporting members 52 on which are supported a pair of guide members 53 each of which is provided with an undercut guide groove 54 adapted to receive cross head 56 which crossheads 56 are connected to piston rods 51 for reciprocation thereby, and are provided with transversely alined apertures 57 through which extends a rod 58 to the opposite ends of which are pivotally secured a pair of carriage actuating arms 59 that are in turn pivotally secured to the carriages as indicated at 61 in Fig. 1.

The pistons in the cylinders 48 are given a reciprocating movement by means of compressed air and to provide for this the air is admitted through lines 62 to valves 63 and 64 by pipe connections 65 and 66. Valve 63 is in communication with cylinder 48 through line 67 and branches 68 at one side of the pistons, and valve 64 is in communication with cylinders 48 by means of pipe 69 and branches 71 at the opposite sides of the pistons. Valves 63 and 64 are each provided with an actuating handle, and the handles 72 are connected by a link 73 for simultaneous movement. When the handles are thrown to one position air under pressure will be admitted from line 62 into one of the valves through its branch connection to the cylinders on one side of the pistons and air from line 62 will be shut off from the other valve and the valve put into communication with the spaces on the opposite sides of the pistons and the atmosphere thus providing an exhaust for the air at this side of the pistons causing movement of the carriage 32 in one direction. When the handles are thrown in the opposite direction compressed air is admitted at the opposite sides of the pistons and the sides which previously were under pressure are put into communication with the atmosphere and the carriages 32 will be moved in a reverse direction. It will accordingly be seen that by moving the handles 72 to opposite positions the pistons and consequently the carriage 32 will be given a reciprocating movement.

Secured to the inner edges of the pusher bars 36 adjacent the ends thereof are a pair of relatively short longitudinally extending angle irons 74 to the vertical legs of which are secured the vertical legs of comparatively long angle irons 75 the horizontally extending legs of which are adapted to support the marginal portions of a screen 76.

Each screen 76 as shown in Figures 12 to 16 inclusive, comprises a marginal frame member 77 of comparatively heavy material and preferably rectangular in cross section. Extending longitudinally of the frame member are a plurality of wires 78 which are spaced transversely of the frame member so that the center line between each two wires of each adjacent pair of wires will coincide with the center line between each consecutive pusher 37, adjacent pairs of wires being spaced from each other a distance that will support adjacent sausages spaced at a proper distance for effective treatment and in a manner to hold the sausages straight. Extending transversely of the frame member 77 are a plurality of comparatively widely spaced strengthening wires 79 similar to the wires 78 and extending thereunder as clearly shown in Fig. 14. The ends of all the wires 78 and 79 preferably terminate flush with the edge of the frame member 77 and rest in arcuate recesses 81 in frame member 77 and secured therein by welding or by any other suitable means. Extending longitudinally of the frame member 77 is a pair of braces 82 each of which comprises a tubular member 83 having widened flattened ends 84 which are suitably secured to the end portions of frame member 77.

In Figs. 18 and 19 a modified form of my invention is disclosed which is adapted for continuous operation with an intermittent reciprocating motion of the pushers and which is designed to operate upon a single mold structure at a time. In this form of construction a frame 10 of generally similar construction to the frame described in the first form of the invention is provided. Supported on each of the members 14 adjacent one end thereof is a pair of brackets 85 the vertical legs of which support the opposite ends of guiding and supporting rods 86, the brackets 85 and rod 86 on one side of the frame being in transverse alinement with the similar brackets and rod on the opposite side of the frame. Secured at its opposite ends to one pair of transversely aligned brackets 85 is a guide 18, and supported by each of the members 15 is a pair of L-shaped brackets 87 the upper ends of the vertical legs of which support a guide rod 88 which is detachably secured to the brackets by nuts 89. Slidably mounted on each of the rods 88 is a carriage 91 which comprises an L-shaped bracket 92 provided at the base thereof with a tubular guide and supporting member 93 through which rod 88 passes. Carriages 91 at opposite sides of the frame have secured to the upper ends of brackets 92 thereof, the opposite ends of a pusher bar 36 provided with a plurality of pushers 37. Carriages 91 are mounted for reciprocating movement on rods 88. To actuate the carriages, rods 94 are pivotally secured at one end thereof by pins 94' to the tubular guide members 93 and at their opposite ends are pivotally connected to crank disks 95 by means of crank pins 96. Crank disks 95 are supported on a shaft 96' suitably journalled on the frame work. Upon each complete revolution of disks 95 the ejector bar 36 will be given one complete reciprocating movement.

As disks 95 make a complete revolution for each complete reciprocating movement of bar 36 and as it is necessary that bar 36 remain at rest for a certain period of time to permit the operator to remove a mold structure and insert another as will more fully hereinafter appear, means are provided whereby the disks 95 are intermittently rotated comprising a Geneva gear arrangement. The Geneva gear includes a crank member 97 supported on a shaft 98 suitably journalled on the frame. Crank member 97 carries an inwardly projecting pin 99. Disposed above member 97 and carried on a shaft suitably journalled from the frame work is a driven member 101 provided with four equally spaced arcuate locking sections 102 adapted to engage a locking sector 103 of crank member 97. Member 101 is further provided with four radially extending slots 103' uniformally spaced between sections 102, and adapted to consecutively receive the pin 99 so that upon each complete revolution of crank 97 member 101 wil be rotated one-quarter revolution and will be locked against rotation except when engaged by the pin 99 by means of the engagement of closing sector 103 with locking sections 102. Shaft 98 and crank 97 are driven continuously from any suitable prime mover.

As member 101 is given only a quarter revolution upon each revolution of member 97 it is necessary that disk 95 and member 101 be geared together so that disk 95 will be given a complete revolution upon each quarter revolution of member 101, and to provide for this member 101 is provided with and drives gear 104 meshing with pinion 105 supported on and driving shaft 96 of the disks 95, the ratio of gear 104 to pinion 105 being 4 to 1. Shafts 96' and the shaft for member 101 are suitably supported by brackets 106 as shown in Fig. 19. Shaft 96' is provided with a pulley 107 driven by a belt, (not shown) from any suitable source of power, or the member 97 may be driven by a sprocket gearing or any other suitable means.

Journalled at each end of frame 10 between the upright members 11 is a sprocket wheel 108 around which conveyor chains 109 are supported. Chains 109 are provided with rollers 110 which upon movement of the sprocket wheels successively engage within the curved recesses in the peripheries of the sprocket wheels in well known manner. Attached transversely of the chains 109 are a plurality of flat cross members, slats or cleats 111 which form a movable endless conveyor for a purpose presently to be described. The upper run of the conveyor may be suitably supported on a track in well known manner.

Carried by certain of the slats 111 are transversely extending screen pushing members 112 which are regularly spaced throughout the active length of the conveyor at a distance equal to the length of the screens 76 adapted to be supported and carried by the conveyor. The conveyor is further provided with a plurality of laterally disposed screen locating and centering members 113 which are preferably formed by bending up the ends of certain of the slats 111 and are regularly spaced intermediate the members 112.

Extending outwardly from the ends of certain of the slats 111 are a plurality of pins 114 which are regularly spaced and preferably six such pins are provided between each two successive pushing members. The pins 114 may be provided on only one side of the conveyor or on both sides as desired.

Pivotally supported on the brackets 92 of the carriages 91 are gravity pawls 115 which are limited in movement opposite to the direction of operative travel of the conveyor by engagement with pins 116 projecting from brackets 92 and which upon forward movement of the carriages are adapted to engage the pins 114, the pawls being free to pass the pins 114 upon opposite or rearward movement of the carriages 91. Carried by the rear sprocket wheels 108 are ratchet wheels 117 and carried by the frame 10 are pawls 118 which by gravity normally engage the teeth of the ratchet wheels preventing reverse rotation thereof but permitting the ratchet wheels 117 to rotate forwardly or in the direction of operative travel of the conveyor. The conveyor comprising the chains 109 and the slats 111 is adapted to support and convey a pair of the screens 76 which are engaged by the members 112 and 113 carried by the slats, and a suitable table 119 is provided, the surface of which is in horizontal alinement with the outer surface of the upper run of slats 111 whereby the screens 76 are automatically pushed on to the table 119 upon operative movement of the conveyor.

*Operation*

In the operation of the apparatus hereinabove described, reference being had first to the form of the invention shown in Figures 1 to 17 inclusive, the operator is kept supplied with mold structures shown in Fig. 17 which are constructed as set forth in detail in said copending application and which have been filled with sausage meat in accordance with the apparatus and method set forth in said application.

The operator in this form of the invention places three of the filled mold structures with the notches in the side bars thereof in engagement with guide rods 26 and with one of the end bars of each of the mold structures in engagement with one of the guides 18 so that the axes of the tubes of the mold structures coincide with the centers of the curved walls 24 of the slots 23 in the guides 18 and with axes of the tubes also alining with the axes of the pushers 37.

It will be noted upon reference to Fig. 2, in which one of the mould structures is shown in operative position, that the ends of the pushers 37 are in normal position located closely adjacent the mold structures to necessitate a minimum travel of the pushers in their reciprocating movement.

The operator, after having placed the mold structures in position as above described, throws the valve arms 72 to one position, whereupon compressed air is admitted to one side of the pistons in cylinders 48 and the pushers 37 simultaneously move forward within the tubes of the mold structures, ejecting the molded sausages therefrom. The sausages in emerging from the tubes pass through slots 23 of the guides 18.

As the pushers move forward in this operation they carry with them the screen 76 which rests on supports 75 which are rigidly supported from the ejector bars 36. As a result the sausages are deposited upon the screen midway between pairs of parallel wires without any relative movement between the sausages and screen, in this manner avoiding deformation of the molded sausages. It is to be further noted from Figs. 1 and 3 that the screen 76 is positioned in relatively close proximity to the molds and pushers, which causes the sausages to drop but a comparatively short distance only after leaving the molds.

The screen 76 is so constructed that the sausages will be laid upon the screen in three rows, the sausages of each row being uniformly transversely spaced and each sausage being supported midway between a pair of the straight longitudinal wires 78 of the screen 76.

The operator now throws the arms 72 in the opposite or reverse position, whereupon compressed air is admitted to the opposite sides of the pistons and the pushers 37 are moved in the opposite direction and are retracted from the tubes of the mold structures. The operator now removes the three empty mold structures and places three filled mold structures in position on the rods 26 ready for another ejecting operation. It is to be noted however that prior to the next pushing or ejecting operation it will be necessary for the operator to push the screen 76 longitudinally on the supports 75 a distance slightly greater than the length of the sausages in order that next three rows of sausages will be deposited midway between the three rows previously ejected from the molds.

The operations above described are repeated in rapid successive order, one of the screens 76 being filled with sausages with each two complete operations of the pusher mechanism and transferred to suitable conveyers for further treatment.

In the form of the invention disclosed in Figs. 18 and 19 the operator places screens on the conveyor and a mold structure on the guide rods 86 with one of the side bars thereof in engagement with the guide 18, the pushers 37 carried by pusher bar 36 being moved in telescoping engagement with the tubes of the mold structure and retracted therefrom upon each complete revolution of disks 95 through the instrumentality of a carriage 91 and rods 94 pivotally connected to the carriages and disks as above set forth.

It is to be noted however that while the member 97 is continuously driven from any suitable source of power that the disks 95 are given a complete revolution during the time that the member 97 makes a quarter revolution, the remainder of the time required for the member 97 to complete its revolution permitting the operator to remove the empty mold structure and insert a loaded one during which interval of time disks 95 and consequently the pushers 37 are at rest.

As the carriages 91 move forward pawls 115 carried by brackets 92 engage transversely alined pins 114 on conveyor slats 111, moving the conveyor and the screens 76 carried thereby forward in unison with the rate of travel of the carriages and consequently the pushers, thus permitting the extended sausages to fall upon the screens without any relative sliding or rubbing action.

Upon reverse movement of the carriages 91 at which time the pushers 37 are retracted from the tubes of the mold structure pawls 115 ride over the next adjacent pair of pins 114 to be engaged therewith upon the next forward movement of the carriages; and as the carriages 91 move backward the conveyor is prevented from reverse movement by means of the co-operating ratchet wheels 117 and pawls 118.

It will accordingly be seen that in this form of the invention while but a single mold structure is operated upon at a time that the operations including feeding of the screens, are continuous and entirely automatic, the time during which the pushers 37 are at rest being preferably just sufficient to enable the operator to remove one mold structure and insert another. As the operation proceeds the screens are filled with sausage and the filled screens are pushed on the table 119.

From the foregoing disclosure it will be appreciated that apparatus for pushing sausages from molds has been provided which is comparatively simple in construction, effective in operation and which is capable of performing its work in an expeditious manner. It will be obvious to those skilled in the art, that the feed of the screens in the form of invention shown in Figs. 1 to 17 inclusive may be made automatic if desired and that more than one mold could be handled at a time in the form of invention shown in Figs. 17 and 18.

While I have shown and described certain specific embodiments of my invention it is to be understood that my invention is not limited to such details but is defined by the scope of the appended claims. Accordingly, what I claim and desire to secure by United States Patent is:

1. Ejecting apparatus comprising a frame member; brackets supported on said frame member in transversely alined pairs; a guide supported by one pair of said brackets; supporting and guiding members extending longitudinally of the frame member and supported by said guide and the other pair of brackets; said supporting and guiding members adapted to support a charged mold, with a face thereof in engagement with said guide; other supporting and guiding members supported by the frame member; means slidably supported on said last supporting and guiding members, in alinement with the bores of said mold; and means to impart reciprocating motion to said last means.

2. Ejecting apparatus comprising a pair of supporting and guiding rods; a plurality of transversely extending uniformly longitudinally spaced immovable guides; said supporting and guiding rods extending through said guides and adapted to support a plurality of molds in engagement with said guides; a plurality of bars slidably supported on said supporting and guiding rods; a plurality of ejecting members carried by each of said bars; a pair of guides carried by the inner edges of said bars and adapted to slidably support a screen member; other supporting and guiding rods; means slidably supported by said last supporting and guiding rods; said means connected to the opposite ends of said bars; and means to impart reciprocating motion to said first means.

3. The construction set forth in claim 2 in which said motion transmitting means comprises a pair of cylinders, reciprocating pistons within said cylinders provided with rods projecting therefrom; guide members pivotally connected to the ends of said rods; arms pivotally connected at corresponding ends thereof to said guides, the opposite ends of said arms being pivotally connected to said carriages; and means for admitting compressed air to opposite sides of said pistons alternately to cause a reciprocating motion of said rods.

4. Ejecting apparatus comprising a frame structure including a pair of longitudinally extending laterally spaced supporting members; a second pair of similarly disposed supporting members inwardly of and laterally outwardly of said first supporting members; a plurality of brackets carried by said first supporting members in longitudinally spaced and laterally alined position; one laterally alined pair of said brackets having inwardly disposed perforated projections; the other brackets supporting a plurality of guides apertured adjacent their opposite ends; longitudinally extending guide bars supported within said apertures in said brackets and said guides; a plurality of ejector bars slidably supported on said guide bars and limited in movement in one direction by said transversely alined pair of brackets and some of said guides; guide members rigidly supported from the inner edges of said ejector bars; said guide members adapted to slidably support a screen member; other brackets supported by said second supporting members; longitudinally extending laterally disposed guide rods carried by said last brackets; carriages slidably supported by said last guide rods and secured to said bars; and means to impart reciprocating motion to said carriages.

5. The construction set forth in claim 4 in which each of said carriages comprises an elongated bar; a pair of tubular guide members supported from the bar to slidably engage one of said guide rods; and a plurality of ejector bars operating brackets carried by and projecting outwardly from said elongated bar.

6. Apparatus for ejecting sausages from molds comprising a frame member; a pair of guide rods supported by said frame member adapted to support a mold; a second pair of guide rods supported by said frame member; carriages slidably engaged with said last guide rods; an ejector assembly carried by said carriages and guided by said first guide rods; a pair of sprocket wheels journalled in said frame member adjacent the opposite ends thereof; a conveyor supported by said sprocket wheels, the upper run of which being in close proximity to said first guide rods; said conveyor adapted to support and convey a plurality of screen members; uniformly spaced outwardly projecting pins carried by opposite sides of the conveyor; gravity pawls carried by said carriages; stop members carried by said carriages to limit movement of the pawls in one direction and permit movement of the pawls in the opposite direction whereby upon forward movement of the carriages the conveyor is carried forward by engagement of the pawls with a pair of said outwardly projecting pins; and means to impart intermittent reciprocating motion to said carriages.

7. The construction set forth in claim 6 in which said conveyor is provided with a plurality of equally spaced transversely disposed screen engaging and propelling members; a pawl and ratchet assembly in co-operation with one of said sprocket wheels to prevent retrograde movement thereof; and a table disposed in horizontal alinement with the outer run of said conveyor and located so as to receive the sausage laden screens projecting thereon by the forward movement of the said conveyor.

8. The method of manufacturing a molded food product that includes molding a multiplicity of units of said product in a multiplicity of molds arranged side by side, and ejecting said units from said molds simultaneously by causing said units to be projected endwise from the molds on a support that is caused to move at substantially the same rate of speed endwise of the molds at which said units are projected from the molds.

9. An apparatus for simultaneously ejecting a multiplicity of molded food product units from a multiplicity of molds arranged side by side comprising a frame, a stop to position said molds, a multiplicity of ejector bars secured in side by side relation in position to enter said molds and eject the units therefrom, means to cause relative motion between said molds and said bars and a support formed to provide a separate pocket for each unit arranged beneath said mold in position to receive the units ejected therefrom, said support being operatively associated with said ejector bars and molds so that it is caused to move at substantially the same rate of speed at which said units are ejected from the molds in the direction of ejection of the units.

10. An apparatus for simultaneously ejecting a multiplicity of molded food product units from a series of sets of molds each comprising a multiplicity of individual molds containing a unit of a food product, comprising a support, a plurality of stops arranged on said support in spaced relation to receive and position said sets of molds in spaced relation on said support, a plurality of sets of ejector bars secured together for movement as a unit relative to the sets of molds, said sets of ejector bars being spaced apart so that a set of molds may be brought into position adjacent each set of ejector bars, and means to cause relative movement between said molds and ejector bars to cause the food product units to be simultaneously ejected from all of the molds of such sets.

11. The combination defined in claim 10 including a support arranged beneath said molds and operatively connected to said molds or ejector bars for movement at a rate of speed that is substantially the same as that at which the food product units are ejected from said molds.

12. The combination defined in claim 10, in which said support for receiving the food product units consists of a reticulated structure comprising longitudinal and transverse members spaced from each other so as to provide an opening between adjacent longitudinal and transverse members of a size sufficient to position and support one of said food product units.

13. Ejecting apparatus comprising a pair of supporting and guiding rods, a guide extending transversely of said supporting and guiding rods, said guide comprising a bar provided with a plurality of open-ended slots, the inner closed ends of which are of arcuate form conforming to the inner walls of the outer halves of tubular molds, said supporting and guiding rods adapted to support charged molds in engagement with said guide, ejectors slidably supported by said supporting and guiding rods, and means to impart reciprocating movement to said ejectors.

14. Ejecting apparatus comprising a frame member, brackets supported on said frame member in transversely aligned pairs, a guide supported by one pair of said brackets, supporting and guiding members extending longitudinally of the frame member and supported by said guide and the other pair of brackets said supporting and guiding members adapted to support a charged mold with a face thereof in engagement with said guide, other supporting and guiding members supported by the frame member, means comprising a bar and a plurality of sectional ejectors detachably supported by said bar slidably supported on said last named supporting and guiding members in alignment with the bores of said mold, and means to impart reciprocating motion to said last named means.

15. An apparatus for simultaneously ejecting a multiplicity of molded food product units from a multiplicity of molds arranged side by side, comprising a frame, a stop to position said molds, a multiplicity of ejector bars secured in side by side relation in position to enter said molds and eject the units therefrom, means to guide said ejector bars and position said molds, means to cause relative motion between said molds and said bars, a support arranged beneath said molds in position to receive the units ejected therefrom, said support being operatively associated with said ejector bars and molds so that it is caused to move at substantially the same rate of speed at which said units are ejected from the molds in the direction of ejection of the units, said molds being interlocked with said guiding means in operative position, but being readily removable therefrom.

16. An apparatus for ejecting a molded food product from an open ended mold comprising a support, a stop arranged on said support to position said mold, an ejector rod and a support for receiving the food products from said mold, said support comprising a reticulated structure consisting of longitudinal and transverse members spaced from each other so as to provide an opening between adjacent longitudinal and transverse members of a size sufficient to position and support one of the molded food product units, said ejector rod and last named support being mounted for movement as a unit with respect to said mold with the last named support relatively close to said mold, and means to cause relative motion between said mold and said ejector rod and said food product support, whereby the food product is ejected from said mold and caused to fall on said food product support when it is moving at approximately the same speed at which the ejector bar is moving.

CHARLES H. VOGT.